(12) United States Patent
Shi

(10) Patent No.: US 12,477,381 B2
(45) Date of Patent: Nov. 18, 2025

(54) TERMINAL DEVICE AND NETWORK DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 436 days.

(21) Appl. No.: 18/060,359

(22) Filed: Nov. 30, 2022

(65) Prior Publication Data

US 2023/0090232 A1 Mar. 23, 2023

Related U.S. Application Data

(63) Continuation of application No. PCT/CN2020/098875, filed on Jun. 29, 2020.

(51) Int. Cl.
*H04W 28/02* (2009.01)
*H04L 47/20* (2022.01)
(Continued)

(52) U.S. Cl.
CPC ......... *H04W 28/0268* (2013.01); *H04L 47/20* (2013.01); *H04L 47/2408* (2013.01); *H04L 47/2483* (2013.01)

(58) Field of Classification Search
CPC . H04L 47/20; H04L 47/2408; H04L 47/2483; H04W 28/0268
See application file for complete search history.

(56) References Cited

U.S. PATENT DOCUMENTS 11,838,106 B2* 12/2023 Li .................. H04J 3/0673
2016/0226922 A1 8/2016 Russell et al.
(Continued)

FOREIGN PATENT DOCUMENTS

CN 109451534 3/2019
CN 109600664 4/2019
(Continued)

OTHER PUBLICATIONS

EPO, Partial Supplementary European Search Report for EP Application No. 20943593.2, Jul. 7, 2023.
(Continued)

*Primary Examiner* — Melanie Jagannathan
(74) *Attorney, Agent, or Firm* — Hodgson Russ LLP

(57) ABSTRACT

Network devices and a terminal device are provided in implementations of the disclosure. The network device includes a transceiver, a processor, and a memory configured to storing a computer program, where the computer program is executable by the processor to cause the network device to receive, from a second network function (NF) element, a packet filter and a quality of service (QoS) flow identifier (QFI) of at least one packet, where the packet filter comprises information related to at least one QoS type of the at least one packet; and distinguish different types of packets according to the packet filter, and transmit the different types of packets through corresponding QoS flows to a second network device.

12 Claims, 9 Drawing Sheets

(51) Int. Cl.
*H04L 47/2408* (2022.01)
*H04L 47/2483* (2022.01)

(56) References Cited

U.S. PATENT DOCUMENTS

| | | | | |
|---|---|---|---|---|
| 2019/0132251 A1* | 5/2019 | Dao | ............ | H04L 69/22 |
| 2019/0253917 A1* | 8/2019 | Dao | ............ | H04W 76/27 |
| 2019/0394279 A1* | 12/2019 | Dao | ............ | H04W 48/04 |
| 2020/0112907 A1* | 4/2020 | Dao | ............ | H04M 15/8016 |
| 2021/0105196 A1* | 4/2021 | Dao | ............ | H04L 43/026 |
| 2021/0329485 A1* | 10/2021 | Han | ............ | H04W 28/0858 |
| 2021/0399989 A1* | 12/2021 | Wang | ............ | H04L 47/2491 |
| 2022/0109633 A1* | 4/2022 | Li | ............ | H04W 48/08 |
| 2022/0385571 A1* | 12/2022 | Dhammawat | ............ | H04L 47/2441 |
| 2022/0417799 A1* | 12/2022 | Schnitzler | ............ | H04W 4/00 |
| 2023/0189368 A1* | 6/2023 | Zhou | ............ | H04W 28/0865 370/328 |
| 2023/0247476 A1* | 8/2023 | Chun | ............ | H04L 65/1073 370/235 |
| 2023/0269574 A1* | 8/2023 | Ha | ............ | H04W 8/20 455/422.1 |
| 2024/0031870 A1* | 1/2024 | Pan | ............ | H04W 4/06 |
| 2024/0397562 A1* | 11/2024 | Talebi Fard | ............ | H04W 76/10 |

FOREIGN PATENT DOCUMENTS

| | | |
|---|---|---|
| CN | 111147422 | 5/2020 |
| EP | 3866506 | 8/2021 |
| WO | 2019218916 | 11/2019 |
| WO | 2020088601 | 5/2020 |
| WO | 2020119596 | 6/2020 |

OTHER PUBLICATIONS

WIPO, International Search Report and Written Opinion for International Application No. PCT/CN2020/098875, Mar. 26, 2021.

EPO, Extended European Search Report for EP Application No. 20943593.2, Oct. 9, 2023.

* cited by examiner

TERMINAL DEVICE AND NETWORK DEVICE

CROSS-REFERENCE TO RELATED APPLICATION(S)

This application is a continuation of International Application No. PCT/CN2020/098875, filed Jun. 29, 2020, the entire disclosure of which is incorporated herein by reference.

TECHNICAL FIELD

This application relates to the field of communication, and in particular to a method for wireless communication, a terminal device, and a network device.

BACKGROUND

In existing network system architectures, for Internet protocol (IP)-type packets, a core network generally distinguishes service data flows through IP multi-tuple (for example, the IP multi-tuple consists of a source address, a destination address, a source port number, a destination port number, and a protocol type above the IP layer), so as to transmit the service data through corresponding QoS flows for obtaining corresponding QoS guarantees. However, for service data with differentiated QoS requirements (such as video data, non-IP data, etc.), types of packets in these service data cannot be distinguished, and the packets cannot be provided with more appropriate QoS guarantee, resulting in the decline of service experience.

SUMMARY

In a first aspect, a network device is provided. The network device includes a transceiver, a processor, and a memory configured to storing a computer program, where the computer program is executable by the processor to cause the network device to receive, from a second network function (NF) element, a packet filter and a quality of service (QoS) flow identifier (QFI) of at least one packet, wherein the packet filter comprises information related to at least one QoS type of the at least one packet; and distinguish different types of packets according to the packet filter, and transmit the different types of packets through corresponding QoS flows to a second network device.

In a second aspect, a terminal device is provided. The terminal device includes a transceiver, a processor, and a memory configured to storing a computer program, where the computer program is executable by the processor to cause the terminal device to receive, from a second NF element, a packet filter and a QFI of at least one packet, wherein the packet filter comprises information related to at least one QoS type of the at least one packet; and distinguish different types of packets according to the packet filter, and transmit the different types of packets through corresponding QoS flows to a network device.

In a third aspect, a network device is provided. The network device includes a transceiver, a processor, and a memory configured to storing a computer program, where the computer program is executable by the processor to perform transmission-quality-control on service data in a QoS flow corresponding to a QFI according to the QFI, a third transmission-quality-control parameter, information related to at least one QoS type of at least one packet, and a second transmission-quality-control parameter corresponding to the information related to the at least one QoS type of the at least one packet that are received from a second NF element.

DETAILED DESCRIPTION

The technical solutions in implementations of the disclosure will be described below with reference to accompanying drawings in the implementations of the disclosure. Obviously, the described implementations are part but not all of the implementations of the disclosure. With regard to the implementations in the disclosure, all other implementations obtained by those of ordinary skill in the art without creative efforts shall fall within the protection scope of the disclosure.

Implementations of the disclosure can be applied to various communication systems, for example, a global system of mobile communication (GSM) system, a code division multiple access (CDMA) system, a wideband code division multiple access (WCDMA) system, general packet radio service (GPRS), long term evolution (LTE) system, advanced long term evolution (LTE-A) system, new radio (NR) system, evolution of NR system, LTE-based access to unlicensed spectrum (LTE-U) system, NR-based access to unlicensed spectrum (NR-U) system, universal mobile telecommunication system (UMTS), wireless local area networks (WLAN), wireless fidelity (Wi-Fi), next generation communication system, or other communication systems.

Generally, a traditional communication system supports a limited number of connections, which is easy to implement. However, with the development of communication technology, mobile communication systems will not only support traditional communication, but also support, for example, device to device (D2D) communication, machine-to-machine (M2M) communication, machine-type communication (MTC), vehicle-to-vehicle (V2V) communication, etc. Implementations of the disclosure can also be applied to these communication systems.

Optionally, the communication system in implementations of the disclosure may be applied to a carrier aggregation (CA) scenario, a dual connectivity (DC) scenario, or a standalone (SA) deployment scenario.

A spectrum applied in implementations of the disclosure is not limited herein. For example, a licensed spectrum or an unlicensed spectrum may be applied in implementations of the disclosure.

Figure 1:
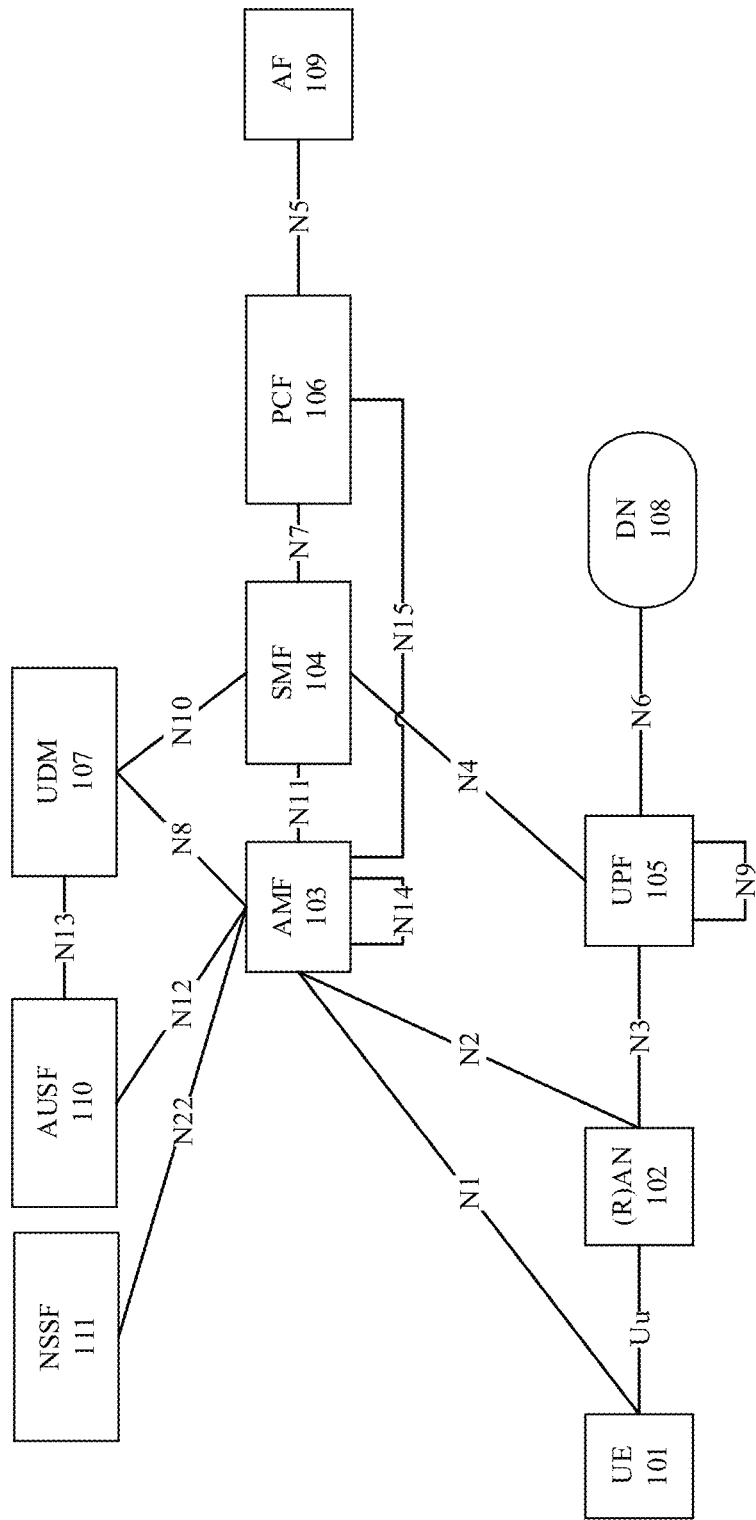
FIG. 1 is a schematic diagram of a communication system architecture in implementations of the disclosure.

FIG. 1 exemplarily illustrates a schematic diagram of a communication system 100 applied in the disclosure. As illustrated in FIG. 1, the communication system 100 mainly includes a terminal device (also referred to as user equipment, UE) 101, an access network (AN) device 102, and an access and mobility management function (AMF) entity 103, a session management function (SMF) entity 104, a user plane function (UPF) entity 105, a policy control function (PCF) entity 106, a unified data management (UDM) entity 107, a data network (DN) 108, an application function (AF) entity 109, an authentication server function (AUSF) entity 110, or a network slice selection function (NSSF) entity 111. It should be noted that the AN device and the NF element in the core network described in this disclosure (such as the AMF entity, SMF entity, UPF entity, PCF entity, AF entity, etc. described above) are also described as network device, That is, the network device in this disclosure is not limited to AN device, but also includes core network elements or devices in other networks.

Specifically, in the communication system 100, the UE 101 establishes an access stratum connection with the AN device 102 through a Uu interface to exchange access stratum messages and wireless data transmission. The UE 101 establishes a non-access stratum (NAS) connection with the AMF entity 103 through an N1 interface to exchange NAS messages. The AN device 102 is connected to the AMF entity 103 through an N2 interface, and is connected to the UPF entity 105 through an N3 interface. Multiple UPF entities 105 are connected with each other through N9 interfaces. The UPF entity 105 is connected with DN 108 through an N6 interface, and is connected with SMF entity 104 through an N4 interface. The SMF entity 104 is connected with PCF entity 106 through an N7 interface, and is connected with UDM entity 107 through an N10 interface. The SMF entity 104 controls the UPF entity 105 through the N4 interface, and is connected to the AMF entity 103 through an N11 interface. Multiple AMF entities 103 are connected with each other through N14 interfaces. The AMF entity 103 is connected to the UDM entity 107 through an N8 interface. The AMF entity 103 is connected with the AUSF entity 110 through an N12 interface. The AMF entity 103 is connected with the NSSF entity 111 through an N22 interface. The AMF entity 103 is connected with the PCF entity 106 through an N15 interface. The PCF entity 106 is connected with the AF entity 109 through an N5 interface, and is connected to the UDM entity 107 through an N13 interface.

In the communication system 100, the UDM entity 107 is a subscription database in the core network, and stores subscription data of users in the 5G network. The AMF entity 103 is a mobility management function in the core network, and the SMF entity 104 is a session management function in the core network. In addition to the mobility management of the UE 101, the AMF entity 103 is also responsible for forwarding messages related to session management between the UE 101 and SMF entity 104. The PCF entity 106 is a policy management function in the core network, and is responsible for formulating policies related to mobility management, session management, charging and the like for the UE 101. The UPF entity 105 is a user plane function in the core network, and performs data transmission with the external data network through the N6 interface, and performs data transmission with the AN device 102 through the N3 interface. After the UE 101 accesses the 5G network through the Uu interface, a protocol data unit (PDU) session data connection between the UE 101 and the UPF entity 105 is established under the control of the SMF entity 104 to perform data transmission. The AMF entity 103 and the SMF entity 104 obtain user subscription data from the UDM entity 107 through the N8 and N10 interfaces, respectively, and obtain policy data from the PCF entity 106 through the N15 and N7 interfaces.

In addition, there is also a network exposure function (NEF) entity in the communication system 100, which is used to interface with a third-party application server, and transfer information between the core network node and the third-party application.

It should be noted that the above communication system 100 is described by taking a 5G communication system as an example. Of course, other 3GPP communication systems, such as a 4G communication system, or a future 3GPP communication system, can be applied in the disclosure, which is not limited herein.

It should be understood that, in the implementations of the disclosure, a device having a communication function in the network/system may be referred to as a communication device.

It should be understood that the terms "system" and "network" are often used interchangeably herein. The term "and/or" in this disclosure is only an association relationship to describe the associated objects, indicating that there can be three kinds of relationships, for example, A and/or B can mean three cases: A exists alone, A and B exist at the same time, and B exist alone. In addition, the character "/" in this disclosure generally indicates that the related objects are an "or" relationship.

In the disclosure, various implementations are described in conjunction with network device and terminal device, where the terminal device may also be referred to as user equipment (UE), access terminal, subscriber unit, subscriber station, mobile station, remote station, remote terminal, mobile device, user terminal, terminal, wireless communication device, user agent, user device, etc. The terminal device may be a station (ST) in WLAN, and may be a cellular phone, a cordless phone, a session initiation protocol (SIP) phone, a wireless local loop (WLL) station, a personal digital assistant (PDA) device, a handheld device capable of wireless communication, a computing device, or other processing devices connected to wireless modems, an in-vehicle device, a wearable device, a terminal device in a next-generation communication system such as NR network, or future terminal equipment in an evolved public land mobile network (PLMN) network, etc.

As an example but not a limitation, in implementations of the disclosure, the terminal device may also be a wearable device. The wearable device can also be called wearable smart device, which is a general term for wearable devices smartly designed and developed for daily wear using wearable technology, such as glasses, gloves, watches, clothing and shoes. The wearable device is a portable device that is worn directly on the body or integrated into the user's clothing or accessories. The wearable device is not only a hardware device, but also can realize powerful functions through software support, data interaction, and cloud interaction. In a broad sense, the wearable smart device includes full-featured, large-scale devices that can realize complete or partial functions without relying on smart phones, such as smart watches or smart glasses, and includes devices that only focus on a certain type of application function and need to cooperate with other devices such as smart phones, such as all kinds of smart bracelets, smart jewelry, etc. for physical sign monitoring.

The AN device 102 may be a device for communicating with mobile devices, and the AN device 102 may be an access point (AP) in WLAN, a base transceiver station (BTS) in GSM or CDMA, a NodeB (NB) in WCDMA, an evolved Node B (eNB or eNodeB) in LTE, a relay station or access point, an in-vehicle device, a wearable device, a network equipment (gNB) in NR network, a network equipment in a future evolved PLMN network, etc.

In implementations of the disclosure, the network device may provide services for a cell, and the terminal device communicates with the network device through transmission resources (for example, frequency-domain resources, or called spectrum resources) used by the cell, where the cell may be corresponding to the network device (such as base station). The cell may belong to a macro base station, or may belong to a Small cell. The Small cell herein may include a Metro cell, a Micro cell, a Pico cell, a Femto cell, etc. The Small cell has characteristics of small coverage and low transmit power, and is suitable for providing high-speed data transmission services.

In a current network system architecture, before transmission of service data, a peer AF entity of the UE provides a service requirement of the application layer to a PCF entity. If the AF is an operator-trusted AF, the AF may directly provide information to PCF. If the AF is a third-party AF and is not an operator-trusted AF, the AF may provide information to the PCF through an NEF. The service requirement of the application layer includes, for example, flow description information for detecting a service data flow, and for IP-type packets, the flow description information is generally IP 5-tuple information consisting of a source address, a destination address, a source port number, a destination port number, and a protocol type above the IP layer. The service requirement of the application layer further includes a QoS-related requirement, such as bandwidth requirement, service type, etc. According to the information received from the AF, the PCF determines a policy and charging control (PCC) rule and transmits the PCC rule to an SMF. The SMF determines an appropriate QoS flow for the received PCC rule. The QoS flow is used to transmit the service data flow corresponding to the PCC rule, so as to provide a QoS guarantee for the service data transmission. For IP-type packets, the core network generally distinguishes service data flows according to the IP multi-tuple (consisting of a source address, a destination address, a source port number, a destination port number, and a protocol type above the IP layer, for example), so as to transmit the service data through corresponding QoS flows and obtain the corresponding QoS guarantee. However, for service data with differentiated QoS requirements (such as video data, non-IP data, etc.), types of packets in these service data cannot be distinguished, and the packets cannot be provided with a more appropriate QoS guarantee, resulting in the decline of service experience. Specifically, some video-type service data flows may be compressed and encoded in the application layer before transmitting to the 3GPP network. During video compression and encoding, for example, for MPEG/HEVC or other coding methods, some video frames are coded into I frames, some video frames are coded into P frames, and some video frames are coded into B frames, where the I frame is a key frame, which is intra coded and only the intra data of the frame is needed for decoding, and the P and B frames are residual-coded data, which need to be combined with adjacent frames to generate a final image during decoding. Therefore, transmission of key frames is very important, and the loss of key frames will cause the loss of reference frames of the associated P and B frames, resulting in decoding failure.

In related arts, for IP-type packets, the core network distinguishes service data flows according to the IP 5-tuple, so as to transmit the service data flows through corresponding QoS flows to obtain corresponding QoS guarantees. However, for above-described video-type service data flow that was compressed and encoded, the 3GPP network cannot identify whether the compressed and encoded data belongs to an I frame, a P frame or a B frame, and can only regard the data as the same service data flow and provide the same QoS guarantee. In this case, the 3GPP network cannot accurately lay emphasis on transmission of the key frames, and data of the key frames may be lost and thus the associated P and B frames cannot be decoded, affecting service experience.

In addition, some non-IP service data flows have no fixed packet-header formats, so that the core network also cannot distinguish these service data flows and can only transmit the service data flows through a general QoS flow, which cannot provide differentiated QoS guarantees for the service data flows.

To this end, the disclosure proposes to distinguish service data flows through information (such as time information) related to QoS types of the packets, which can distinguish packets in a service data flow at a finer level, so as to provide different QoS guarantees for packets according to the information (such as time information) related to QoS types of the packets. In this way, for data of high importance or requiring better QoS guarantee, a higher QoS guarantee can be provided.

Figure 2:
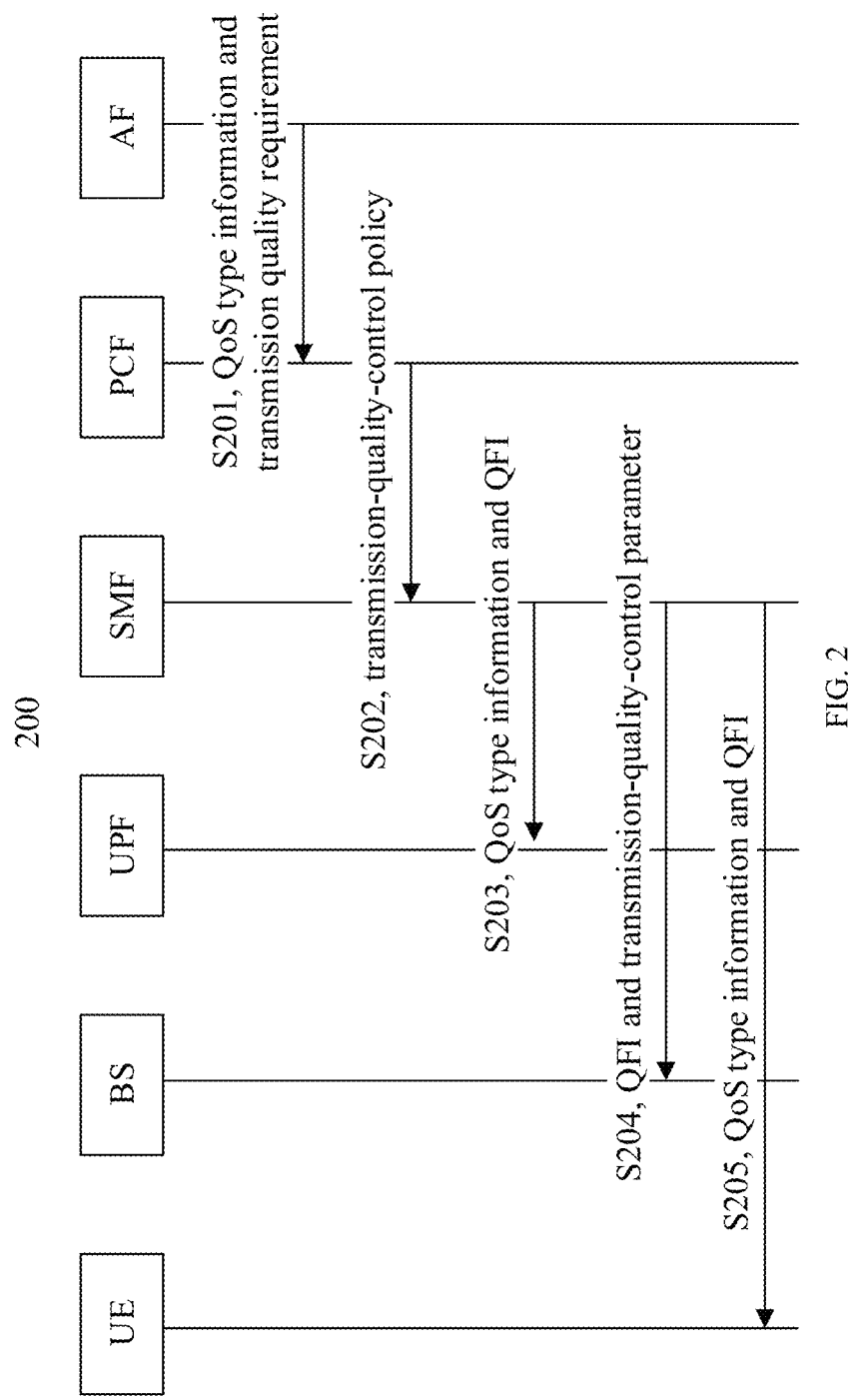
FIG. 2 is a schematic flowchart of a method for wireless communication in implementations of the disclosure.

FIG. 2 is a schematic flowchart of a method 200 for wireless communication in implementations of the disclosure. As illustrated in FIG. 2, the method 200 may include the following.

In step 201, a PCF entity obtains information related to a QoS type of a service data packet and a transmission quality requirement from an AF entity. As an implementation, the information related to the QoS type of the service data packet is transmitted through a packet filter which is used for packet filtering. The packet filter further includes an IP multi-tuple, such as IP 5-tuple consisting of a source address, a destination address, a source port number, a destination port number, and a protocol type above the IP layer. In this case, even if two packets have a same IP multi-tuple header, the two packets can be distinguished into different service data flows by the core network due to different QoS types.

Step S201 in FIG. 2 only illustrates the obtaining step by the PCF from the AF entity. Optionally, the PCF may also obtain the information related to the QoS type of the service data packet and the transmission quality requirement from a UE. Specifically, the UE reports to the PCF through a core network element. A process of obtaining information from the UE is not detailed herein.

In step S202, the PCF entity determines a transmission-quality-control policy and transmits the policy to an SMF entity. The transmission-quality-control policy includes a packet filter and a first transmission-quality-control parameter, and the packet filter includes the information related to the QoS type of the service data packet.

In step S203, the SMF entity determines a QoS flow for transmitting the packet according to the packet filter and the first transmission-quality-control parameter. The SMF transmits, to a UPF entity, the packet filter that contains the information related to the QoS type of the service data packet, and a QoS flow identity (QFI) of the determined QoS flow for transmitting the packet. When downlink data arrives at the UPF entity, the UPF entity can distinguish different data according to the packet filter that includes the information related to the QoS type of the service data packet, and then transmits the data through different QoS flows to the base station.

In step S204, the SMF transmits the QFI and the first transmission-quality-control parameter to the base station. The base station controls, with the transmission-quality-control parameter corresponding to the QFI, transmission of the data received in the certain QoS flow.

In step S205, the SMF transmits, to the UE, the packet filter that includes time information and the QFI of the determined QoS flow for transmitting the packet. For uplink data, the UE can distinguish different data according to the packet filter that includes the information related to the QoS type of the service data packet, and then transmit the data through different QoS flows to the base station.

It should be noted that, steps S203, S204, and S205 may be executed in any order.

It should be noted that, the PCF in implementations of the disclosure may be for example a PCF entity in a 5G communication system, and of course, may also be an entity with a policy control function in other 3GPP communication systems, which is not limited in the disclosure. The SMF in implementations of the disclosure may be for example an SMF entity in the 5G communication system, and of course, may also be an entity with a session management function in other 3GPP communication systems, which is not limited in the disclosure. The AF in implementations of the disclosure may be for example an AF entity in the 5G communication system, and of course, may also be an entity with an application function in other 3GPP communication systems, which is not limited in the disclosure. The UPF in implementations of the disclosure may be for example a UPF entity in the 5G communication system, and of course, may also be an entity with a user plane function in other 3GPP communication systems, which is not limited in the disclosure. Similarly, the base station in implementations of the disclosure may be for example an AN device, a radio access network (RAN) device, or a base station (gNB) in the 5G communication system. Of course, the base station may also be a base station in other 3GPP communication systems. The base station may alternatively be an access point in another access technology network, which is not limited in the disclosure.

Optionally, the terminal device in implementations may be an ordinary handheld terminal device, an unmanned aerial vehicle (UAV) device, an IOT device, or other types of terminal devices, including other types of machine devices, which is not limited in the disclosure.

Optionally, in addition to the information related to the QoS type of the service data packet, the packet filter may further include one or more of a domain name, slice information, IP multi-tuple header information (such as IP 5-tuple information or IP 3-tuple information), header information in Ethernet protocol format, an application server address, or an application identifier. Other information may also be included, which is not limited in the disclosure.

Optionally, the transmission quality requirement includes one or more of a service type, a QCI (such as 5QI), a priority, a BER, a transmission latency, a bit rate requirement, a key data indication, a priority transmission indicator, or a transmission failure tolerance time. Other information may also be included, which is not limited in the disclosure.

Optionally, the transmission-quality-control parameter includes one or more of a QCI (such 5QI), a priority, a bit error rate (BER), a transmission latency, a bit rate requirement, a key data indication, a priority transmission indicator, or a transmission failure tolerance time. Other information may also be included, which is not limited in the disclosure.

In order to facilitate understanding of steps of the method illustrated in FIG. 2, for the purpose of illustration but not limitation, the time information is taken as an example of the information related to the QoS type of the service data packet to further describe a part of the content in FIG. 2.

For example, the time information includes one or more of a packet transmitting time, a packet arriving time at a third generation partnership project (3GPP) network, a packet duration, a packet end time, or a packet transmitting period, etc.

Figure 3:
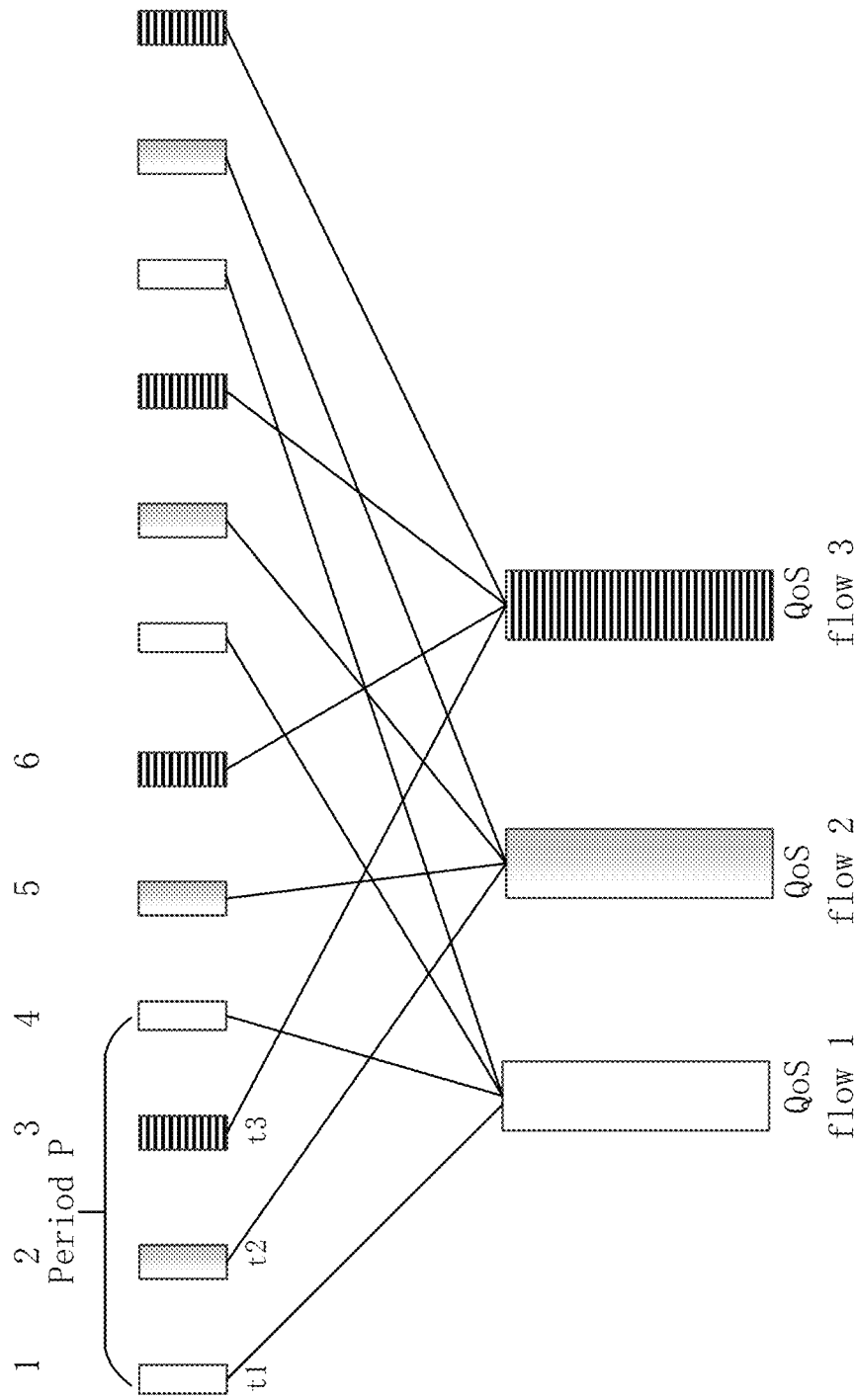
FIG. 3 is a schematic diagram illustrating a data flow in the method for wireless communication illustrated in the flowchart of FIG. 2 in implementations of the disclosure.

FIG. 3 is a schematic diagram illustrating a data flow used in the method 200 for wireless communication illustrated in FIG. 2 in implementations of the disclosure.

In FIG. 3, packet 1, packet 2, and packet 3 each have a different QoS type, that is, require a different level of QoS guarantee. As an example, QoS flows 1, 2, and 3 are video data flows, and packet 1 is an I-frame packet, packet 2 is a P-frame packet, and packet 3 is a B-frame packet. In FIG. 3, assume that packets 1, 2, and 3 each have a same IP header (or an unstructured header that cannot be identified by the 3GPP network, if the QoS flow is a non-IP service data flow). Since QoS types of the packets cannot be identified according to only header information, differentiated QoS guarantees cannot be provided for the packets. For data flows in FIG. 3, the packet filter, which is included in the transmission-quality-control policy transmitted from the PCF entity to the SMF entity in step S202 of the method 200 for wireless communication in implementations of the disclosure, includes time information {arriving at t1, period P}, {arriving at t2, period P}, and {arriving at t3, period P}. The time information here is a specific form of the information related to the QoS type of the service data packet in some steps in the flowchart of the method 200 for wireless communication illustrated in FIG. 2 in implementations of the disclosure. The information related to the QoS type of the service data packet may also be in other forms, as long as different QoS types may be distinguished with the form. According to the time information in the filter, three kinds of packets may be distinguished, and packets of the same QoS type may be transmitted through the same QoS flow as needed. For example, in FIG. 3, since packet 1 and packet 4 have a same QoS type (such as a QoS guarantee in I-frame level), both packet 1 and packet 4 are transmitted in QoS flow 1 to the base station. Since packet 2 and packet 5 have a same QoS type (such as a QoS guarantee in P-frame level), both packet 2 and packet 5 are transmitted in QoS flow 2 to the base station. Since packet 3 and packet 6 have a same QoS type (such as a QoS guarantee in B-frame level), both packet 3 and packet 6 are transmitted in QoS flow 3 to the base station. The base station can control according to the QFI and the corresponding transmission-quality-control parameter received from the SMF entity, for example, guarantee levels for QoS flows 1, 2, and 3 may be controlled to be QoS flow 1>QoS flow 2>QoS flow 3.

In this implementation, the base station only needs to receive the QFI and the corresponding transmission-quality-control parameter from the SMF entity, and does not need to distinguish the packets itself, so that computation complexity at the base-station side can be reduced. In addition, since different data is distinguished by the UE and the UPF according to the packet filter and then transmitted to the base station through different QoS flows, this implementation can also be applied to a scenario where there is a need to distinguish packets of uplink or downlink data.

It should be noted again that FIG. 3 is only described for illustrative purpose, and is not intended to limit the scope of the present disclosure.

Figure 4:
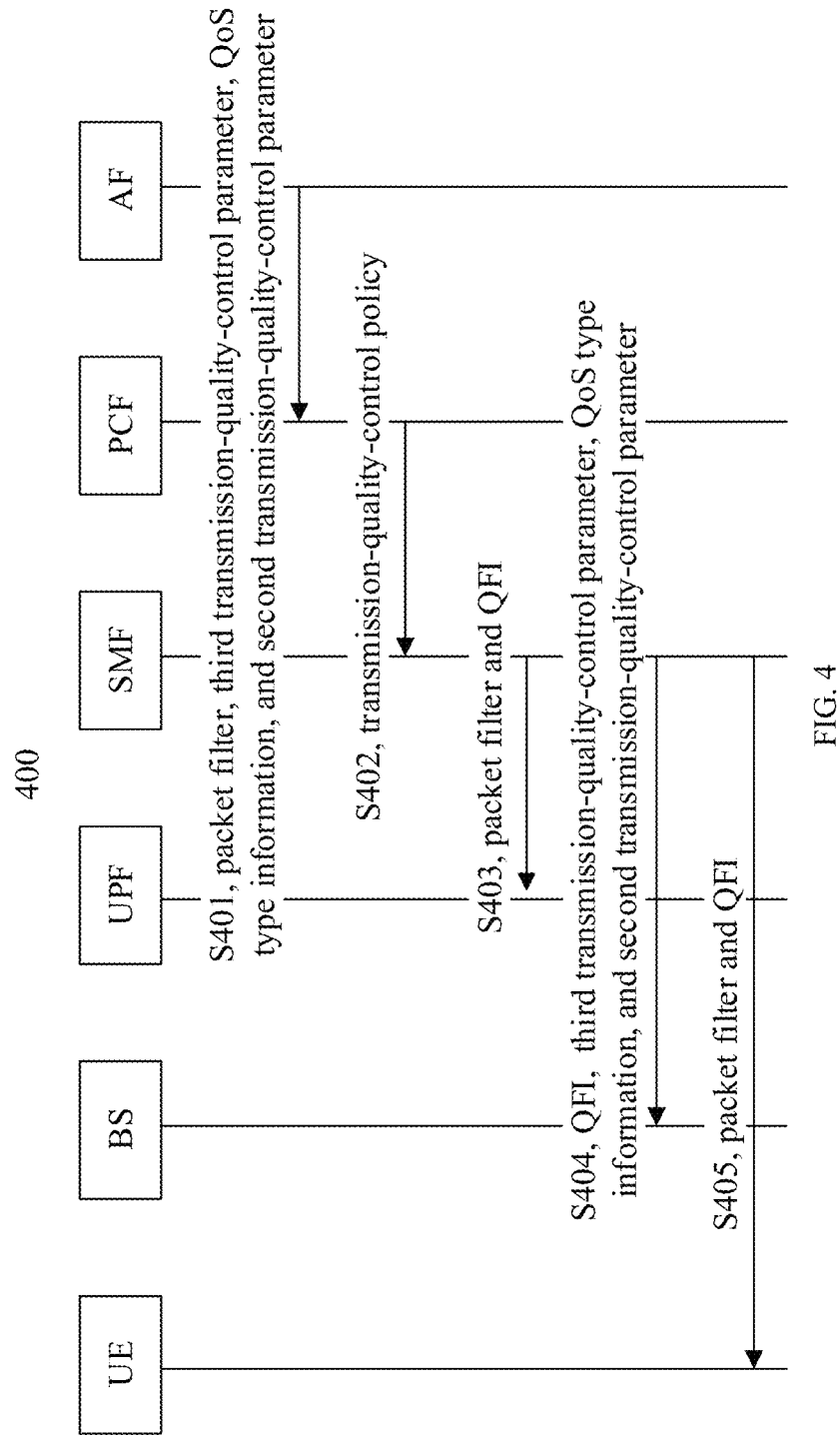
FIG. 4 is a schematic flowchart of a method for wireless communication in other implementations of the disclosure.

FIG. 4 is a schematic flowchart of a method 400 for wireless communication in other implementations of the disclosure. As illustrated in FIG. 4, the method 400 may include the following.

In step S401, different from the implementation illustrated in FIG. 2, the PCF obtains from the AF entity a packet filter and a third transmission-quality-control requirement for service data, and information related to the QoS type of the service data packet and a corresponding second transmission quality requirement. The packet filter is used for packet filtering. The packet filter includes an IP multi-tuple, such as IP 5-tuple consisting of a source address, a destination address, a source port number, a destination port number, and a protocol type above the IP layer.

Step S401 in FIG. 4 only illustrates the step of obtaining the information by the PCF from the AF entity. Optionally, the PCF may also obtain the information from a UE. Specifically, the US reports to the PCF through a core network element. A process of obtaining information from the UE is not detailed herein.

In step S402, the PCF entity determines a transmission-quality-control policy for the service data and transmits the policy to an SMF entity. Different from the implementation illustrated in FIG. 2, in this step, the transmission-quality-control policy includes the packet filter and the third transmission-quality-control parameter corresponding to the packet filter (the third transmission-quality-control parameter is used for general transmission-quality control for a service data flow corresponding to the packet filter). The transmission-quality-control policy further includes one or more groups each including information related to the QoS type of the service data packet and a corresponding second transmission-quality-control parameter. The information related to the QoS type of the service data packet will not be transmitted through the packet filter. That is, in this implementation, the information related to the QoS type of the service data packet is not included in the packet filter. The second transmission-quality-control parameter is used for special transmission-quality control of a packet in the service data flow that matches the information related to the QoS type. The second transmission-quality-control parameter may be combined with the third transmission-quality-control parameter for transmission-quality control of the packet matching the information related to the QoS type, or may replace a single or multiple parameters in the third transmission-quality-control parameter for transmission-quality control of the packets matching the information related to the QoS type. From another point of view, the third transmission-quality-control parameter is used for transmission-quality control at service-data-flow level corresponding to the packet filter, and the second transmission-qualitycontrol parameter is used for transmission-quality control at packet level in the service data flow. That is, the second transmission-quality-control parameter is used for a finer control requirement.

In an example, the third transmission-quality-control parameter is priority 1+transmission latency a, and the transmission-quality-control policy further includes two groups of information related to the QoS type of the service data packet and the second transmission-quality-control parameter:

First group: information A related to the QoS type, the second transmission-quality-control parameter is transmission failure tolerance time b;

Second group: information B related to the QoS type, the second transmission-quality-control parameter is priority 2.

In this case, general transmission-quality control on a service data flow corresponding to the packet filter is: priority 1+transmission latency a.

Transmission-quality control on a packet that matches the packet filter and further matches information A related to QoS type is: priority 1+transmission latency a+transmission failure tolerance time b.

Transmission-quality control on a packet that matches with packet filter and further matches information B related to QoS type is: priority 2+transmission latency a.

In step S403, the SMF entity determines a QoS flow for transmitting the packet according to the packet filter and the third transmission-quality-control parameter, where the packet filter does not include the information related to the QoS type of the service data packet. Different from the implementation illustrated in FIG. 2, in this step, the SMF transmits to a UPF entity the packet filter that does not include the information related to the QoS type of the service data packet, and a QFI of the determined QoS flow for transmitting the packet. When downlink data arrives at the UPF entity, the UPF entity can distinguish different QoS flows (rather than packets of different QoS types in the implementation illustrated in FIG. 2) according to the packet filter that does not include the information related to the QoS type of the service data packet, and then transmits the data to the base station through different QoS flows.

In step S404, the SMF entity transmit the QFI and the third transmission-quality-control parameter corresponding to the QoS flow to the base station. With the third transmission-quality-control parameter corresponding to the QFI, the base station performs transmission control of the data received from the certain QoS flow. In addition, the SMF further transmits to the base station information related to the QoS type of the service data packet and the second transmission-quality-control parameter (or a list of combination thereof). The base station can distinguish different service data packets (such as I frame, P frame, B frame) in a same QoS flow according to the information related to the QoS type of the service data packet, and performs differentiated transmission-quality control according to corresponding second transmission-quality-control parameters.

In step S405, the SMF transmits to the UE the packet filter that does not include the information related to the QoS type of the service data packet and the QFI of the determined QoS flow for transmitting the packet. For uplink data, the UE can transmit the data to the base station through different QoS flows according to the packet filter. In this implementation, since the packet filter does not include the information related to the QoS type of the service data packet, service data that can pass a same packet filter, such as service data with same header information such as IP multi-tuple, may be transmitted through the same QoS flow even if the service data has different QoS types.

It should be noted that, steps S403, S404, and S405 may be executed in any order.

It should be noted that, as described above, the second transmission-quality-control parameter in this implementation is different from the third transmission-quality-control parameter, and is also different from the first transmission-quality-control parameter in the method described in FIG. 2.

It should be noted that, the PCF in implementations of the disclosure may be, for example, a PCF entity in a 5G communication system, and of course, may also be an entity with a policy control function in other 3GPP communication systems, which is not limited in the disclosure. The SMF in implementations of the disclosure may be, for example, an SMF entity in the 5G communication system, and of course, may also be an entity with a session management function in other 3GPP communication systems, which is not limited in the disclosure. The AF in implementations of the disclosure may be, for example, an AF entity in the 5G communication system, and of course, may also be an entity with an application function in other 3GPP communication systems, which is not limited in the disclosure. The UPF in implementations of the disclosure may be, for example, a UPF entity in the 5G communication system, and of course, may also be an entity with a user plane function in other 3GPP communication systems, which is not limited in the disclosure. Similarly, the base station in implementations of the disclosure may be, for example, an AN device or a radio access network (RAN) device or a base station (gNB) in the 5G communication system. Of course, the base station may also be a base station in other 3GPP communication systems. The base station may alternatively be an access point in another access technology network, which is not limited in the disclosure.

Optionally, the terminal device in this implementation may be an ordinary handheld terminal device, may be an unmanned aerial vehicle (UAV) device, an IOT device, or may be other types of terminal devices, including other types of machine device, which is not limited in the disclosure.

Optionally, the information related to the QoS type of the service data packet and the second transmission quality requirement, which are received by the PCF entity from the AF entity, may be in a form of list, for example, the list includes second transmission quality requirements each corresponding to a QoS type.

Optionally, in addition to the information related to the QoS type of the service data packet, the packet filter may further include one or more of a domain name, slice information, IP multi-tuple header information (such as IP 5-tuple information or IP 3-tuple information), header information in Ethernet protocol format, an application server address, or an application identifier. Other information may also be included, which is not limited in the disclosure.

Optionally, the transmission quality requirement includes one or more of: a service type, a QCI (such as 5QI), a priority, a BER, a transmission latency, a bit rate requirement, a key data indication, a priority transmission indicator, or a transmission failure tolerance time. Other information may also be included, which is not limited in the disclosure.

Optionally, the transmission-quality-control parameter may include one or more of: a service type, a QCI (such 5QI), a priority, a bit error rate (BER), a transmission latency, a bit rate requirement, a key data indication, a priority transmission indicator, or a transmission failure tolerance time. Other information may also be included, which is not limited in the disclosure.

In order to facilitate understanding of steps of the method illustrated in FIG. 4, for the purpose of illustration but not limitation, the time information is taken as an example of the information related to the QoS type of the service data packet to further describe a part of the content in FIG. 4.

For example, the time information includes one or more of a packet transmitting time, a packet arriving time at a third generation partnership project (3GPP) network, a packet duration, a packet end time, or a packet transmitting period, etc.

In this implementation, for uplink and downlink data, the UE and the UPF entity do not need to distinguish packets, so that computation complexity at the UE and the UPF entity can be reduced, which can satisfy the power consumption requirement for the UE and the core network. In addition, with the transmission-quality-control parameter corresponding to the QFI, the base station can control transmission of the data received from the certain QoS flow. For each QoS flow, the base station can further distinguish different service data in the same QoS flow and perform differentiated transmission-quality control according to the corresponding transmission-quality-control parameters. In other words, the base station can control the service data using both transmission-quality-control parameters at QoS-flow level and packet level, so that a tradeoff between efficiency and performance can be achieved as needed.

Figure 5:
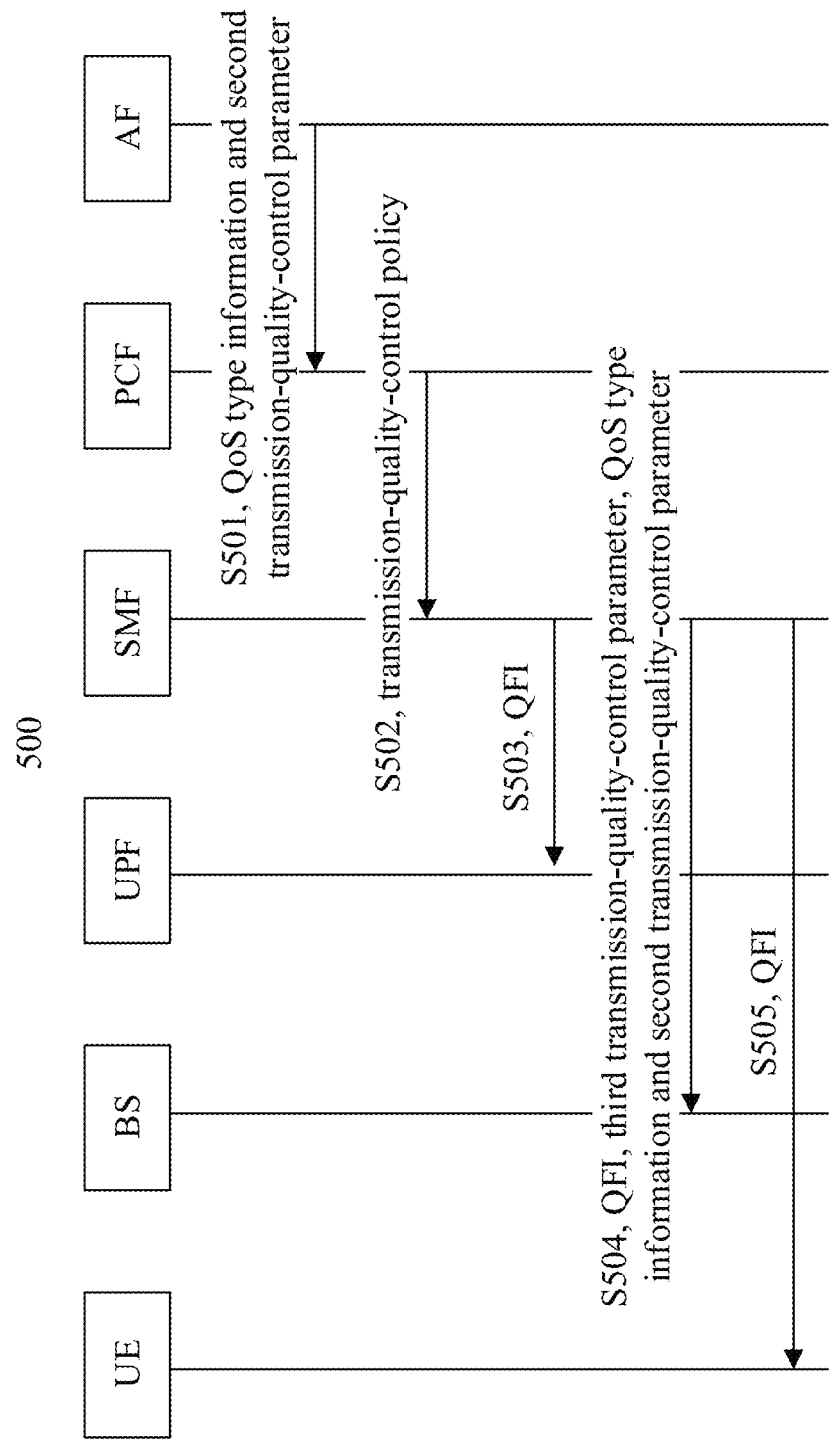
FIG. 5 is a schematic flowchart of a method for wireless communication in other implementations of the disclosure.

FIG. 5 is a schematic flowchart of a method 500 for wireless communication in other implementations of the disclosure. As illustrated in FIG. 5, the method 500 may include the following.

In step S501, different from the implementation illustrated in FIG. 4, the PCF obtains from the AF entity only information related to the QoS type of the service data packet and a corresponding second transmission quality requirement.

Step S501 in FIG. 5 only illustrates the step of obtaining the information by the PCF from the AF entity. Optionally, the PCF may also obtain the information from a UE. Specifically, the US reports to the PCF through a core network element. A process of obtaining information from the UE is not detailed herein.

In step S502, the PCF entity determines a transmission-quality-control policy for the service data and transmits the policy to a SMF entity. Different from the implementation illustrated in FIG. 2, in this step, the transmission-quality-control policy only includes the information related to the QoS type of the service data packet and the corresponding second transmission quality requirement.

In step S503, the SMF entity determines that all packets of the session will be transmitted through a same QoS flow, using the third transmission-quality-control parameter corresponding to the QoS flow that is preconfigured by the SMF entity or received from the PCF entity in advance. The SMF entity transmits the QFI to the UPF entity. When downlink data arrives at the UPF entity, the UPF entity transmits all service data in the session to the base station through the same QoS flows. Different from the implementation illustrated in FIG. 4, the SMF entity does not receive the packet filter and the third transmission-quality-control parameter corresponding to the QoS flow from the PCF entity in this stage, but obtains the same by pre-configuration or previous reception.

In step S504, the SMF entity transmits the QFI and the third transmission-quality-control parameter corresponding to the QoS flow to the base station. With the third transmission-quality-control parameter corresponding to the QFI, the base station controls transmission of the data received from the certain QoS flow. In addition, the SMF further transmits to the base station information related to the QoS type of the service data packet and the second transmission-quality-control parameter (or a list of combination thereof). The base station can distinguish different service data packets (such as I frame, P frame, B frame) in a same QoS flow according to the information related to the QoS type of the service data packet, and performs differentiated transmission-quality control according to the corresponding second transmission-quality-control parameters. This step is the same as step S404 in the implementation of FIG. 4.

In step S505, the SMF entity transmits to the UE the QFI of the determined QoS flow for transmitting the packet. For uplink data, the UE transmit all service data in the session to the base station through the same QoS flow.

It should be noted that, steps S503, S504, and S505 may be executed in any order.

It should be noted that, as described above, the second transmission-quality-control parameter in this implementation is different from the third transmission-quality-control parameter, and is also different from the transmission-quality-control parameter in the method described in FIG. 2. Differences between the first, second, and third transmission-quality-control parameters will be detailed in the following by examples.

It should be noted that, the PCF in implementations of the disclosure may be, for example, a PCF entity in a 5G communication system, and of course, may also be an entity with a policy control function in other 3GPP communication systems, which is not limited in the disclosure. The SMF in implementations of the disclosure may be, for example, an SMF entity in the 5G communication system, and of course, may also be an entity with a session management function in other 3GPP communication systems, which is not limited in the disclosure. The AF in implementations of the disclosure may be, for example, an AF entity in the 5G communication system, and of course, may also be an entity with an application function in other 3GPP communication systems, which is not limited in the disclosure. The UPF in implementations of the disclosure may be, for example, a UPF entity in the 5G communication system, and of course, may also be an entity with a user plane function in other 3GPP communication systems, which is not limited in the disclosure. Similarly, the base station in implementations of the disclosure may be, for example, an AN device or a radio access network (RAN) device or a base station (gNB) in the 5G communication system. Of course, the base station may also be a base station in other 3GPP communication systems. The base station may alternatively be an access point in another access technology network, which is not limited in the disclosure.

Optionally, the terminal device in this implementation may be an ordinary handheld terminal device, may be an unmanned aerial vehicle (UAV) device, an IOT device, or may be other types of terminal devices, including other types of machine device, which is not limited in the disclosure.

Optionally, the information related to QoS type of service data packet and the second transmission quality requirement, which are received by the PCF entity from the AF entity, may be in a form of list, for example, the list includes second transmission quality requirements each corresponding to a QoS type.

Optionally, in addition to the information related to the QoS type of the service data packet, the packet filter may further include one or more of a domain name, slice information, IP multi-tuple header information (such as IP 5-tuple information or IP 3-tuple information), header information in Ethernet protocol format, an application server address, or an application identifier. Other information may also be included, which is not limited in the disclosure.

Optionally, the transmission quality requirement includes one or more of: a service type, a QCI (such as 5QI), a priority, a BER, a transmission latency, a bit rate requirement, a key data indication, a priority transmission indicator, or a transmission failure tolerance time. Other information may also be included, which is not limited in the disclosure.

Optionally, the transmission-quality-control parameter may include one or more of: a QCI (such 5QI), a priority, a bit error rate (BER), a transmission latency, a bit rate requirement, a key data indication, a priority transmission indicator, or a transmission failure tolerance time. Other information may also be included, which is not limited in the disclosure.

In order to facilitate understanding of steps of the method illustrated in FIG. 5, for the purpose of illustration but not limitation, the time information is taken as an example of the information related to the QoS type of the service data packet to further describe a part of the content in FIG. 5.

For example, the time information includes one or more of a packet transmitting time, a packet arriving time at a third generation partnership project (3GPP) network, a packet duration, a packet end time, or a packet transmitting period, etc.

In this implementation, the SMF does not need to obtain the transmission control requirement for the QoS flow from the UE or AF for each transmission, but can obtain the transmission control requirement by pre-configuration or previous reception, thus reducing the transmission latency. The implementation may be applied to service data with unstructured headers that cannot be distinguished using the packet filter. In addition, for uplink and downlink data, the UE and UPF entity only need to receive the QFI, which can reduce computation complexity at the UE and the UPF entity and satisfy the consumption requirement for the UE and the core network. In addition, with the transmission-quality-control parameter corresponding to the QFI, the base station can control transmission of the data received from the certain QoS flow. For each QoS flow, the base station can further distinguish different service data in the same QoS flow and perform differentiated transmission-quality control according to the corresponding transmission-quality-control parameters. In other words, the base station can control the service data using both transmission-quality-control parameters at QoS-flow level and packet level, so that a tradeoff between efficiency and performance can be achieved as needed.

Figure 6:
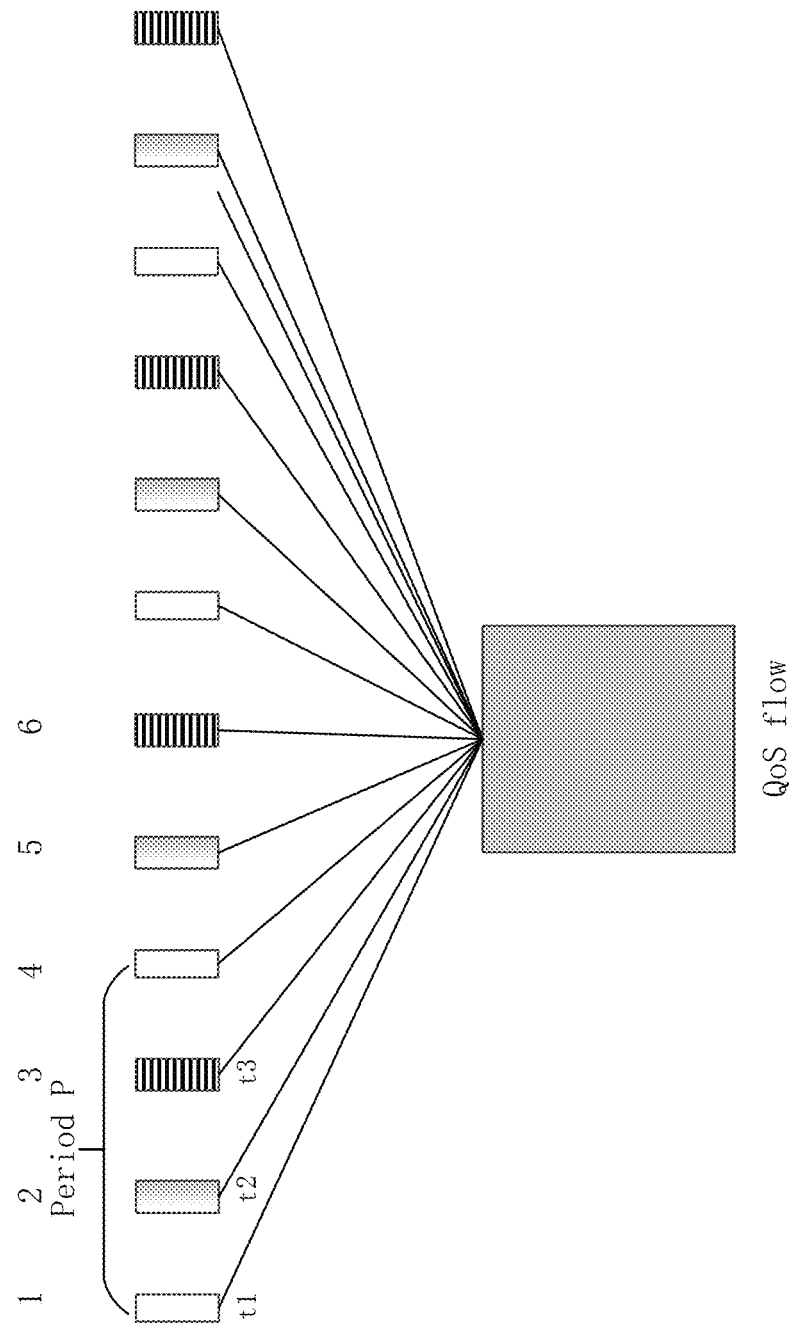
FIG. 6 is a schematic diagram illustrating a data flow in the methods for wireless communication illustrated in the flowcharts of FIG. 4 and FIG. 5 in implementations of the disclosure.

FIG. 6 is a schematic diagram illustrating a data flow used in the methods for wireless communication illustrated in FIG. 4 and FIG. 5 in implementations of the disclosure.

In FIG. 6, packet 1, packet 2, and packet 3 each have a different QoS type. In some transmissions, different QoS guarantees are required, and in some transmissions, only the same QoS guarantee is required. For example, the QoS flow is a video data flow. As can be seen from FIG. 6, packet 1 is an I-frame packet, packet 2 is a P-frame packet, and packet 3 is a B-frame packet, and these three packets will be transmitted in a same QoS flow, which is obviously different from the case of FIG. 3, for satisfying different requirements. In FIG. 6, assume that packets 1, 2, and 3 have a same IP header (or an unstructured header that cannot be identified by the 3GPP network, if the QoS flow is a non-IP service data flow). When transmitting the QoS to the base station, the UPF entity or the UE only needs to transmit the packets through the same QoS flow to the base station (at this stage, it is not necessary to further distinguish packets of different QoS types) using the packet filter including only IP-multi-tuple as in the implementation of FIG. 4 or without using the packet filter as in the implementation of FIG. 5, but not using the time information {arriving at t1, period P}, {arriving at t2, period P}, {arriving at t3, period P}. The time information here is a specific form of the information related to the QoS type of the service data packet in some steps in the flowchart of the methods for wireless communication illustrated in FIG. 4 or FIG. 5 in implementations of the disclosure. The information related to the QoS type of the service data packet may also in other forms, as long as different QoS types may be distinguished with the form. Referring back to FIG. 4 and FIG. 5, in steps S404 and S504, since the SMF entity further transmits to the base station the information related to the QoS type of the service data packet and the second transmission-quality-control parameter (or a list of combination thereof), when the base station needs to further forward the arrived data, the base station can distinguish the three kinds of packets through the time information {arriving at t1, period P}, {arriving at t2, period P}, and {arriving at t3, period P}. For example, the base station can identify the data with {arriving at t1, period P} as key data and provide key resource scheduling to ensure transmission of the key data.

It should be noted again that FIG. 6 is only described for illustrative purpose, and is not intended to limit the scope of the present invention.

It should be noted that the first transmission-quality-control parameter in the implementation in FIG. 2 may be regarded as a division and/or combination of the second transmission-quality-control parameter and the third transmission-quality-control parameter according to the implementations illustrated in FIG. 4 and FIG. 5, but not necessarily a direct patchwork of parameters. The following is illustrated as an example, and it should be noted that parameters used in the example is for illustration but not limitation.

For the implementation illustrated in FIG. 2:

Policy 1: the information in the data filter is IP multi-tuple header+time information a. The first transmission-quality-control parameter is priority 1+transmission latency a+transmission failure tolerance time a.

Policy 2: the information in the data filter is IP multi-tuple header+time information b. The transmission-quality-control parameter is priority 2+transmission latency a+transmission failure tolerance time b. Assume here that priority 2 is higher than priority 1.

For example, for the implementation illustrated in FIG. 4:

Only one policy: the information in the data filter is the IP multi-tuple header. The third transmission-quality-control parameter is priority 1+transmission latency a. The policy further includes time information a and a corresponding second transmission-quality-control parameter: transmission failure tolerance time a, and time information b and corresponding second transmission-quality-control parameters: key data indication+transmission failure tolerance time b. With the key data indication, a priority corresponding to the packet matching time information b can be boosted, which can achieve a same effect as the implementation illustrated in FIG. 2.

The method implementations of the disclosure are described in detail above with reference to FIG. 2 to FIG. 6, and the device implementations of the disclosure are described in detail below with reference to FIG. 7 to FIG. 13.

Figure 7:
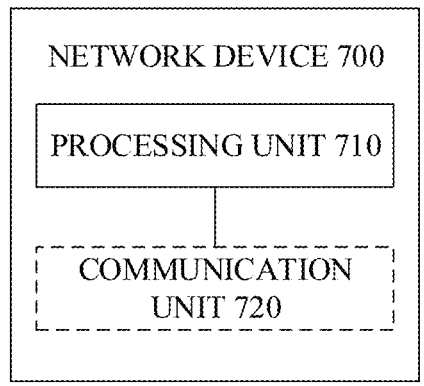
FIG. 7 is a schematic block diagram of a network device provided according to implementations of the disclosure.

FIG. 7 is a schematic block diagram of a network device 700 in implementations of the disclosure. The network device 700 includes a communication unit and a processing unit.

The communication unit is configured to transmit a transmission-quality-control policy to a second NF element, where the transmission-quality-control policy includes information related to at least one QoS type of at least one packet.

Optionally, the transmission-quality-control policy includes a packet filter and a first transmission-quality-control parameter, where the packet filter includes the information related to the at least one QoS type of the at least one packet.

Optionally, the transmission-quality-control policy further includes a second transmission-quality-control parameter corresponding to the at least one QoS type of the at least one packet.

Optionally, the transmission-quality-control policy further includes a packet filter and a third transmission-quality-control parameter.

Optionally, each of the first transmission-quality-control parameter, the second transmission-quality-control parameter, and the third transmission-quality-control parameter includes at least one of: a QoS class identifier (QCI), a priority, a bit error rate (BER), a transmission latency, a bit rate requirement, a key data indication, a priority transmission indicator, or a transmission failure tolerance time.

Optionally, the information related to the at least one QoS type of the at least one packet includes time information related to transmission of the packet.

Optionally, the time information includes at least one of: a packet transmitting time, a packet arriving time at a third generation partnership project (3GPP) network, a packet duration, a packet end time, or a packet transmitting period.

Optionally, the packet filter further includes at least one of: a domain name, slice information, Internet protocol (IP) multi-tuple header information, header information in Ethernet protocol format, an application server address, or an application identifier.

Optionally, before the communication unit transmits the transmission-quality-control policy to the second NF element, the processing unit is configured to determine the transmission-quality-control policy according to the information related to the at least one QoS type of the at least one packet and a transmission quality requirement obtained from a terminal device or a third NF element.

Optionally, the transmission quality requirement includes at least one of: a service type, a QCI, a priority, a BER, a transmission latency, a bit rate requirement, a key data indication, a priority transmission indicator, or a transmission failure tolerance time.

Optionally, the network device is a policy control function (PCF) entity, the second NF element is a session management function (SMF) entity, and the third NF element is an application function (AF) entity.

Figure 8:
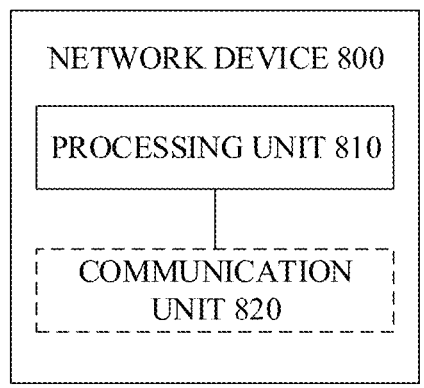
FIG. 8 is a schematic block diagram of a network device provided according to implementations of the disclosure.

FIG. 8 is a schematic block diagram of a network device 800 in implementations of the disclosure. The network device 800 includes a communication unit and a processing unit.

The communication unit is configured to receive a transmission-quality-control policy from a first NF element, where the transmission-quality-control policy includes information related to at least one quality of service (QoS) type of at least one packet.

Optionally, the transmission-quality-control policy includes a packet filter and a first transmission-qualitycontrol parameter, where the packet filter includes the information related to the at least one QoS type of the at least one packet.

Optionally, the processing unit is configured to determine a QoS flow identifier (QFI) of the at least one packet according to the packet filter and the first transmission-quality-control parameter.

Optionally, the communication unit is configured to transmit the packet filter and the QFI of the at least one packet to a fourth NF element and/or a terminal device.

Optionally, the communication unit is configured to transmit the QFI of the at least one packet and the first transmission-quality-control parameter to a second network device.

Optionally, the transmission-quality-control policy further includes a second transmission-quality-control parameter corresponding to the at least one QoS type of at least one packet.

Optionally, the processing unit is configured to assign a same QFI to all packets belonging to a same session, and determine a third transmission-quality-control parameter for the QFI, where the third transmission-quality-control parameter is pre-configured or obtained from the first NF element in advance.

Optionally, the communication unit is configured to transmit the same QFI to a fourth NF element and/or a terminal device.

Optionally, the communication unit is configured to transmit the same QFI and the third transmission-quality-control parameter to a second network device.

Optionally, the communication unit is configured to transmit the information related to the at least one QoS type of the at least one packet and the second transmission-quality-control parameter to the second network device.

Optionally, the transmission-quality-control policy further includes a packet filter and a third transmission-quality-control parameter.

Optionally, the processing unit is configured to determine a QFI of the at least one packet according to the packet filter and the third transmission-quality-control parameter.

Optionally, the communication unit is configured to transmit the packet filter and the QFI of the at least one packet to a fourth NF element and/or a terminal device.

Optionally, the communication unit is configured to transmit the QFI of the at least one packet and the third transmission-quality-control parameter to a second network device.

Optionally, the communication unit is configured to transmit the information related to the at least one QoS type of the at least one packet and the second transmission-quality-control parameter to the second network device.

Optionally, each of the first transmission-quality-control parameter, the second transmission-quality-control parameter, and the third transmission-quality-control parameter includes at least one of: a QoS class identifier (QCI), a priority, a bit error rate (BER), a transmission latency, a bit rate requirement, a key data indication, a priority transmission indicator, or a transmission failure tolerance time.

Optionally, the information related to the at least one QoS type of the at least one packet includes time information related to transmission of the packet.

Optionally, the time information includes at least one of: a packet transmitting time, a packet arriving time at a third generation partnership project (3GPP) network, a packet duration, a packet end time, or a packet transmitting period.

Optionally, the packet filter further includes at least one of: a domain name, slice information, Internet protocol (IP) multi-tuple header information, header information in Ethernet protocol format, an application server address, or an application identifier.

Optionally, the first NF element is a policy control function (PCF) entity, the network device is a session management function (SMF) entity, and the fourth NF element is a user plane function (UPF) entity.

Figure 9:
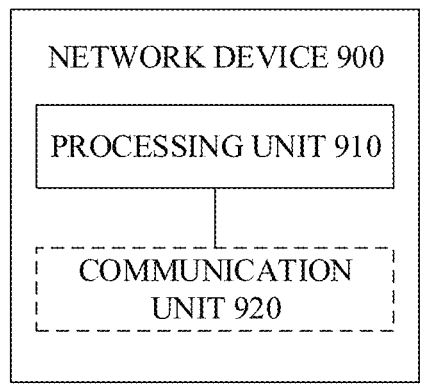
FIG. 9 is a schematic block diagram of a network device provided according to implementations of the disclosure.

FIG. 9 is a schematic block diagram of a network device 900 in implementations of the disclosure. The network device 900 includes a communication unit and a processing unit.

The communication unit is configured to receive, from a second network function (NF) element, a packet filter and a quality of service (QoS) flow identifier (QFI) of at least one packet, where the packet filter includes information related to at least one QoS type of the at least one packet.

The communication unit is further configured to distinguish different types of packets according to the packet filter, and transmit the different types of packets through corresponding QoS flows to a second network device.

Optionally, the information related to the at least one QoS type of the at least one packet includes time information related to transmission of the packet.

Optionally, the time information includes at least one of: a packet transmitting time, a packet arriving time at a third generation partnership project (3GPP) network, a packet duration, a packet end time, or a packet transmitting period.

Optionally, the packet filter further includes at least one of: a domain name, slice information, Internet protocol (IP) multi-tuple header information, header information in Ethernet protocol format, an application server address, or an application identifier.

Optionally, the second NF element is a session management function (SMF) entity, the network device is a user plane function (UPF) entity, and the second network device is a base station.

Figure 10:
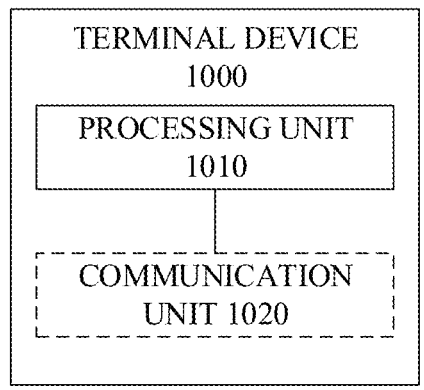
FIG. 10 is a schematic block diagram of a terminal device provided according to implementations of the disclosure.

FIG. 10 is a schematic block diagram of a terminal device 1000 in implementations of the disclosure. The terminal device 1000 includes a communication unit and a processing unit.

The communication unit is configured to receive, from a second network function (NF) element, a packet filter and a quality of service (QoS) flow identifier (QFI) of at least one packet, where the packet filter includes information related to at least one QoS type of the at least one packet;

The communication unit is configured to distinguish different types of packets according to the packet filter, and transmit the different types of packets through corresponding QoS flows to a network device.

Optionally, the information related to the at least one QoS type of the at least one packet includes time information related to transmission of the packet.

Optionally, the time information includes at least one of: a packet transmitting time, a packet arriving time at a third generation partnership project (3GPP) network, a packet duration, a packet end time, or a packet transmitting period.

Optionally, prior to receiving, from the second NF element, the packet filter and the QFI of the at least one packet, the communication unit is configured to transmit the time information related to transmission of the packet and a transmission quality requirement to a first NF element.

Optionally, the transmission quality requirement includes at least one of: a service type, a QoS class identifier (QCI), a priority, a bit error rate (BER), a transmission latency, a bit rate requirement, a key data indication, a priority transmission indicator, or a transmission failure tolerance time.

Optionally, the packet filter further includes at least one of: a domain name, slice information, Internet protocol (IP) multi-tuple header information, header information in Ethernet protocol format, an application server address, or an application identifier.

Optionally, the first NF element is a policy control function (PCF) entity, the second NF element is a session management function (SMF) entity, and the network device is a based station.

Figure 11:
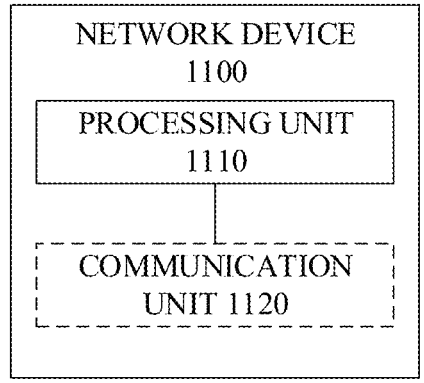
FIG. 11 is a schematic block diagram of a network device provided according to implementations of the disclosure.

FIG. 11 is a schematic block diagram of a network device 1100 in implementations of the disclosure. The network device 1100 includes a communication unit and a processing unit.

The communication unit is configured to perform transmission-quality-control on service data in a quality of service (QoS) flow corresponding to a QoS flow identifier (QFI) according to the QFI, a third transmission-quality-control parameter, information related to at least one QoS type of at least one packet, and a second transmission-quality-control parameter corresponding to the information related to the at least one QoS type of the at least one packet that are received from a second network function (NF) element.

Optionally, the information related to the at least one QoS type of the at least one packet includes time information related to transmission of the packet.

Optionally, the time information includes at least one of: a packet transmitting time, a packet arriving time at a third generation partnership project (3GPP) network, a packet duration, a packet end time, or a packet transmitting period.

Optionally, the second transmission-quality-control parameter each includes at least one of: a QoS class identifier (QCI), a priority, a bit error rate (BER), a transmission latency, a bit rate requirement, a key data indication, a priority transmission indicator, or a transmission failure tolerance time.

Optionally, the second NF element is a session management function (SMF) entity, and the network device is a base station.

Figure 12:
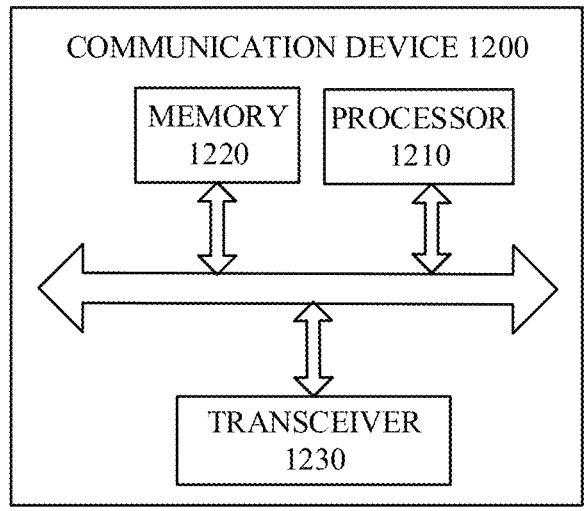
FIG. 12 is a schematic block diagram of a communication device provided according to implementations of the disclosure.

FIG. 12 is a schematic structural diagram of a communication device 1200 provided in an implementation of the disclosure. The communication device 1200 illustrated in FIG. 12 includes a processor 1210, and the processor 1210 can call and run a computer program from a memory to implement the method in the implementation of the disclosure.

Optionally, as illustrated in FIG. 12, the communication device 1200 may further include a memory 1220. The processor 1210 may call and run a computer program from the memory 1220 to implement the methods in the implementations of the disclosure.

The memory 1220 may be a separate device independent of the processor 1210, or may be integrated into the processor 1210.

Optionally, as illustrated in FIG. 12, the communication device 1200 may further include a transceiver 1230, and the processor 1210 may control the transceiver 1230 to communicate with other devices, specifically, may send information or data to other devices, or receive other devices Information or data sent by a device.

The transceiver 1230 may include a transmitter and a receiver. The transceiver 1230 may further include antennas, and the number of the antennas may be one or more.

Optionally, the communication device 1200 may specifically be the network device of the implementation of the disclosure, and the communication device 1200 may implement the corresponding processes implemented by the network device in each method of the implementation of the disclosure. For brevity, details are not repeated here.

Optionally, the communication device 1200 may specifically be a mobile terminal/terminal device in the implementations of the disclosure, and the communication device 1200 may implement the corresponding processes implemented by the mobile terminal/terminal device in each method in the implementations of the disclosure, and will not be repeated here.

Figure 13:
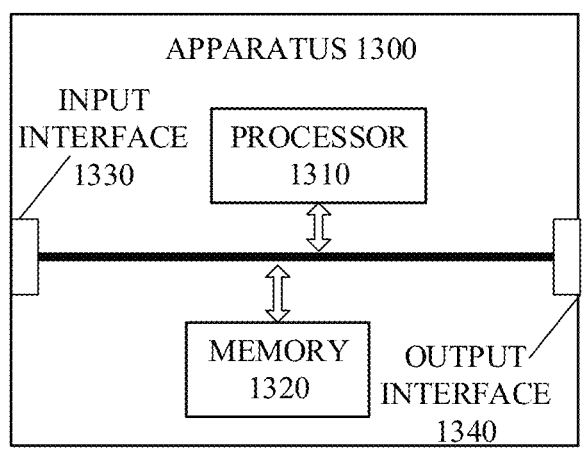
FIG. 13 is a schematic block diagram of an apparatus provided according to implementations of the disclosure.

FIG. 13 is a schematic structural diagram of an apparatus according to an implementation of the disclosure. The apparatus 1300 illustrated in FIG. 13 includes a processor 1310, and the processor 1310 can call and run a computer program from a memory, so as to implement the method in the implementation of the disclosure.

Optionally, as illustrated in FIG. 13, the apparatus 1300 may further include a memory 1320. The processor 1310 may call and run a computer program from the memory 1320 to implement the methods in the implementations of the disclosure.

The memory 1320 may be a separate device independent of the processor 1310, or may be integrated into the processor 1310.

Optionally, the apparatus 1300 may further include an input interface 1330. The processor 1310 can control the input interface 1330 to communicate with other devices or chips, and specifically, can obtain information or data sent by other devices or chips.

Optionally, the apparatus 1300 may further include an output interface 1340. The processor 1310 may control the output interface 1340 to communicate with other devices or chips, and specifically, may output information or data to other devices or chips.

Optionally, the apparatus can be applied to the network device in the implementations of the disclosure, and the apparatus can implement the corresponding processes implemented by the network device in the various methods of the implementations of the disclosure, which are not repeated here for brevity.

Optionally, the apparatus can be applied to the mobile terminal/terminal device in the implementations of the disclosure, and the apparatus can implement the corresponding processes implemented by the mobile terminal/terminal device in each method of the implementations of the disclosure. For brevity, details are not repeated here.

Optionally, the apparatus in the implementation of the disclosure may also be a chip. For example, the chip can be a system-on-chip.

Figure 14:
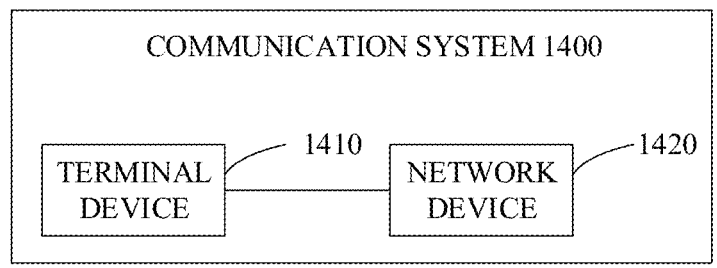
FIG. 14 is a schematic block diagram of a communication system provided according to implementations of the disclosure.

FIG. 14 is a schematic block diagram of a communication system 1400 provided by an implementation of the disclosure. As shown in FIG. 14, the communication system 1400 includes a terminal device 1410 and a network device 1420.

The terminal device 1410 may be configured to implement the corresponding functions implemented by the terminal device in the above method, and the network device 1420 may be configured to implement the corresponding functions implemented by at least one of the PCF entity, base station, SMF entity, UPF entity, or AF entity. For brevity, details will not be repeated here.

It should be understood that the processor in this implementation of the disclosure may be an integrated circuit chip, which has a signal processing capability. In the implementation process, each step of the above method implementations may be completed by a hardware-integrated logic circuit in a processor or an instruction in the form of software. The above-mentioned processor may be a general-purpose processor, a digital signal processor (DSP), an application specific integrated circuit (ASIC), a field programmable gate array (FPGA) or other available Programming logic devices, discrete gate or transistor logic devices, discrete hardware components. The methods, steps, and logic block diagrams disclosed in the implementations of this application can be implemented or executed. A general purpose processor may be a microprocessor or the processor may be any conventional processor or the like. The steps of the method disclosed in conjunction with the implementations of the disclosure may be directly embodied as executed by a hardware decoding processor, or executed by a combination of hardware and software modules in the decoding processor. The software modules may be located in random access memory, flash memory, read-only memory, programmable read-only memory or electrically erasable programmable memory, registers and other storage media mature in the art. The storage medium is located in the memory, and the processor reads the information in the memory, and completes the steps of the above method in combination with its hardware.

It can be understood that the memory in this implementation of the disclosure may be a volatile memory or a non-volatile memory, or may include both volatile and non-volatile memory. The non-volatile memory may be Read-Only Memory (ROM), Programmable Read-Only Memory (PROM), Erasable Programmable Read-Only Memory (EPROM), Erasable Programmable Read-Only Memory (EPROM), Erase programmable read-only memory (Electrically EPROM, EEPROM) or flash memory. Volatile memory may be Random Access Memory (RAM), which acts as an external cache. By way of example and not limitation, many forms of RAM are available, such as Static RAM (SRAM), Dynamic RAM (DRAM), Synchronous DRAM, SDRAM), double data rate synchronous dynamic random access memory (Double Data Rate SDRAM, DDR SDRAM), enhanced synchronous dynamic random access memory (Enhanced SDRAM, ESDRAM), synchronous link dynamic random access memory (Synchlink DRAM, SLDRAM)) and Direct Rambus RAM (DR RAM). It should be noted that the memory of the systems and methods described herein is intended to include, but not be limited to, these and any other suitable types of memory.

It should be understood that the above-mentioned memory is an example but not a limitative description. For example, the memory in this implementation of the disclosure may also be a static random access memory (static RAM, SRAM), a dynamic random access memory (dynamic RAM, DRAM), Synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection Dynamic random access memory (synch link DRAM, SLDRAM) and direct memory bus random access memory (Direct Rambus RAM, DR RAM) and so on. That is, the memory in the implementations of the disclosure is intended to include but not limited to these and any other suitable types of memory.

Implementations of the disclosure further provide a computer-readable storage medium for storing a computer program.

Optionally, the computer-readable storage medium can be applied to the network device in the implementations of the disclosure, and the computer program enables the computer to execute the corresponding processes implemented by the network device in the various methods of the implementations of the disclosure. For brevity, details will not be repeated.

Optionally, the computer-readable storage medium can be applied to the mobile terminal/terminal device in the implementations of the disclosure, and the computer program enables the computer to execute the corresponding processes implemented by the mobile terminal/terminal device in each method of the implementations of the disclosure. For brevity, details will not be repeated.

Implementations of the disclosure also provide a computer program product, including computer program instructions.

Optionally, the computer program product can be applied to the network device in the implementations of the disclosure, and the computer program instructions cause the computer to execute the corresponding processes implemented by the network device in each method of the implementations of the disclosure.

Optionally, the computer program product can be applied to the mobile terminal/terminal device in the implementations of the disclosure, and the computer program instructions cause the computer to execute the corresponding processes implemented by the mobile terminal/terminal device in each method of the implementations of the disclosure, For brevity, details are not repeated here.

The implementations of the disclosure also provide a computer program.

Optionally, the computer program can be applied to the network device in the implementations of the disclosure. When run on the computer, the computer program causes the computer to execute the corresponding processes implemented by the network device in each method of the implementations of the disclosure. For brevity, details will not be repeated.

Optionally, the computer program may be applied to the mobile terminal/terminal device in the implementations of the disclosure. When run on the computer, the computer program causes the computer to execute the corresponding processes implemented by the mobile terminal/terminal device in each method of the implementations of the disclosure. For brevity, details will not be repeated.

Those of ordinary skill in the art can realize that the units and algorithm steps of each example described in conjunction with the implementations disclosed herein can be implemented in electronic hardware, or a combination of computer software and electronic hardware. Whether these functions are performed in hardware or software depends on the specific application and design constraints of the technical solution. Those of ordinary skill in the art may implement the described functionality using different methods for each particular disclosure, but such implementations should not be considered beyond the scope of this disclosure.

Those skilled in the art can clearly understand that, for the convenience and brevity of description, the specific working process of the above-described systems, devices and units may refer to the corresponding processes in the foregoing method implementations, which will not be repeated here.

In the several implementations provided in this disclosure, it should be understood that the disclosed system, apparatus and method may be implemented in other manners. For example, the apparatus implementations described above are only illustrative. For example, the division of the units is only a logical function division. In actual implementation, there may be other division methods. For example, multiple units or components may be combined or integrated into another system, or some features can be ignored, or not implemented. On the other hand, the shown or discussed mutual coupling or direct coupling or communication connection may be through some interfaces, indirect coupling or communication connection of devices or units, and may be in electrical, mechanical or other forms.

The units described as separate components may or may not be physically separated, and components displayed as units may or may not be physical units, that is, may be located in one place, or may be distributed to multiple network units. Some or all of the units may be selected according to actual needs to achieve the purpose of the solution in this implementation.

In addition, each functional unit in each implementation of the disclosure may be integrated into one processing unit, or each unit may exist physically alone, or two or more units may be integrated into one unit.

The functions, if implemented in the form of software functional units and sold or used as independent products, may be stored in a computer-readable storage medium. For such understanding, the technical solution of the disclosure can be embodied in the form of a software product in essence, or the part that contributes to the prior art or the part of the technical solution. The computer software product is stored in a storage medium, including Several instructions are used to cause a computer device (which may be a personal computer, a server, or a network device, etc.) to execute all or part of the steps of the methods described in the various implementations of the disclosure. The aforementioned storage medium includes: U disk, mobile hard disk, read-only memory (ROM), random access memory (RAM), magnetic disk or optical disk and other media that can store program codes.

The above are only specific implementations of the disclosure, but the protection scope of the disclosure is not limited. Any change or replacement that can easily be thought of by those skilled in the art within the technical scope disclosed in the disclosure shall be covered in the protection scope of the disclosure. Therefore, the protection scope of the disclosure should be based on the protection scope of the claims.

What is claimed is:

1. A network device, comprising:
a transceiver;
a processor; and
a memory configured to storing a computer program, wherein the computer program is executable by the processor to cause the transceiver to:
receive, from a second network function (NF) element, a packet filter and a quality of service (QOS) flow identifier (QFI) of at least one packet, wherein the packet filter comprises information related to at least one QoS type of the at least one packet;
wherein the computer program is executable by the processor to cause the processor to:
distinguish different types of packets according to the packet filter; and
wherein the computer program is executable by the processor to cause the transceiver to:
transmit the different types of packets through corresponding QoS flows to a second network device;
wherein the information related to the at least one QoS type of the at least one packet comprises time information related to transmission of the packet, and
wherein the time information comprises at least one of:
a packet transmitting time, a packet arriving time at a third generation partnership project (3GPP) network, a packet duration, a packet end time, or a packet transmitting period.

2. The network device of claim 1, wherein the packet filter further comprises at least one of:
a domain name, slice information, Internet protocol (IP) multi-tuple header information, header information in Ethernet protocol format, an application server address, or an application identifier.

3. The network device of claim 1, wherein the second NF element is a session management function (SMF) entity, the network device is a user plane function (UPF) entity, and the second network device is a base station.

4. A terminal device, comprising:
a transceiver;
a processor; and
a memory configured to storing a computer program, wherein the computer program is executable by the processor to cause the transceiver to:
receive, from a second network function (NF) element, a packet filter and a quality of service (QOS) flow identifier (QFI) of at least one packet, wherein the packet filter comprises information related to at least one QoS type of the at least one packet; and
wherein the computer program is executable by the processor to cause the processor to:
distinguish different types of packets according to the packet filter; and
wherein the computer program is executable by the processor to cause the transceiver to:
transmit the different types of packets through corresponding QoS flows to a network device;
wherein the information related to the at least one QoS type of the at least one packet comprises time information related to transmission of the packet, and
wherein the time information comprises at least one of:
a packet transmitting time, a packet arriving time at a third generation partnership project (3GPP) network, a packet duration, a packet end time, or a packet transmitting period.

5. The terminal device of claim 4, wherein the computer program is executable by the processor to further cause the transceiver to:
prior to receiving, from the second NF element, the packet filter and the QFI of the at least one packet,
transmit the time information related to transmission of the packet and a transmission quality requirement to a first NF element.

6. The terminal device of claim 5, wherein the first NF element is a policy control function (PCF) entity.

7. The terminal device of claim 5, wherein the transmission quality requirement comprises at least one of:
a service type, a QoS class identifier (QCI), a priority, a bit error rate (BER), a transmission latency, a bit rate requirement, a key data indication, a priority transmission indicator, or a transmission failure tolerance time.

8. The terminal device of claim 4, wherein the packet filter further comprises at least one of:
a domain name, slice information, Internet protocol (IP) multi-tuple header information, header information in Ethernet protocol format, an application server address, or an application identifier.

9. The terminal device of claim 4, wherein the second NF element is a session management function (SMF) entity, and the network device is a based station.

10. A network device, comprising:
a transceiver;
a processor; and
a memory configured to storing a computer program, the computer program being executable by the processor to:
perform transmission-quality-control on service data in a quality of service (QOS) flow corresponding to a QoS flow identifier (QFI) according to the QFI, a third transmission-quality-control parameter, information related to at least one QoS type of at least one packet, and a second transmission-quality-control parameter corresponding to the information related to the at least one QoS type of the at least one packet that are received from a second network function (NF) element;
wherein the information related to the at least one QoS type of the at least one packet comprises time information related to transmission of the packet, and wherein the time information comprises at least one of:
a packet transmitting time, a packet arriving time at a third generation partnership project (3GPP) network, a packet duration, a packet end time, or a packet transmitting period.

11. The network device of claim 10, wherein the second transmission-quality-control parameter each comprises at least one of:
a QoS class identifier (QCI), a priority, a bit error rate (BER), a transmission latency, a bit rate requirement, a key data indication, a priority transmission indicator, or a transmission failure tolerance time.

12. The network device of claim 10, wherein the second NF element is a session management function (SMF) entity, and the network device is a base station.

* * * * *